Figure 1:
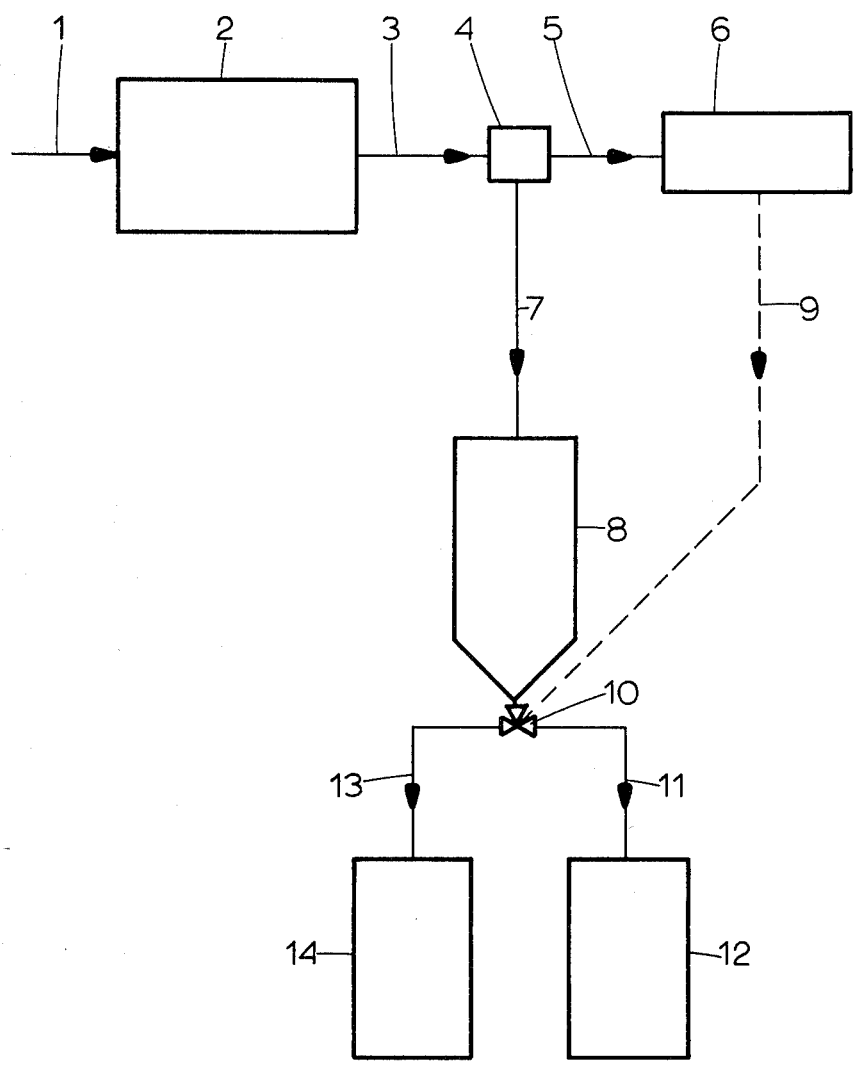

United States Patent [19]

Dane et al.

[11] 4,442,054
[45] Apr. 10, 1984

[54] PROCESS FOR CONTINUOUSLY MONITORING AND CONTROLLING THE PRODUCT FILM QUALITY FROM A POLYMER PRODUCTION UNIT

[75] Inventors: Lambertus M. Dane, Voerendaal; Johannes C. A. Engels, Sittard; Cornelis L. Stevens, Geleen, all of Netherlands

[73] Assignee: Stamicarbon BV, Geleen, Netherlands

[21] Appl. No.: 263,731

[22] Filed: May 14, 1981

[30] Foreign Application Priority Data

May 14, 1980 [NL] Netherlands .......................... 8002782

[51] Int. Cl.³ .............................................. B29H 19/00
[52] U.S. Cl. ...................................... 264/40.1; 264/37
[58] Field of Search .......................... 264/37, 40.1, 40.7

[56] References Cited

U.S. PATENT DOCUMENTS

| | | | |
|---|---|---|---|
| 3,030,665 | 4/1962 | Eagleton | 425/467 |
| 3,293,918 | 12/1966 | Zavasnik | 73/863.11 |
| 3,593,011 | 7/1971 | Beauxis et al. | 235/151.1 |
| 3,608,001 | 9/1971 | Kowalski et al. | 264/40 |
| 4,137,754 | 2/1979 | Colombo et al. | 264/40.1 |
| 4,233,255 | 11/1980 | Moon | 264/40.7 |

FOREIGN PATENT DOCUMENTS 1126098 9/1968 United Kingdom .

Primary Examiner—Donald E. Czaja
Assistant Examiner—W. Thompson

[57] ABSTRACT

A process for continuously monitoring and controlling product film quality from a polymer production unit and for automatically separating acceptable and unacceptable polymer product includes the steps of continuously formulating a solid particulate polymer product in the polymer production unit; withdrawing a product sample and preparing a film from the product sample; analyzing the film properties; continuously delivering the product remaining after product sampling to a residence holding device; and providing a signal representative of the film analysis so as to divert acceptable product in the holding device to product storage or unacceptable product to a by-product delivery line.

4 Claims, 2 Drawing Figures

PROCESS FOR CONTINUOUSLY MONITORING AND CONTROLLING THE PRODUCT FILM QUALITY FROM A POLYMER PRODUCTION UNIT

The invention relates to a process for the preparation of a polymer followed by continuous inspection and control of the polymer quality and subsequently storage of the polymer.

In the continuous preparation of polymers it is necessary to regularly analyze the quality of the product obtained so that deviations of the product from the required specifications can timely be detected, controlled and corrected.

Preferably, this is done continuously. In the preparation of, for instance, low-density polyethylene, the same is presently done by measurement of the melt index, e.g., the melt index is measured for the polymer melt exiting from the reactor section or from the extruder. The process is then controlled according to the analytical results. This can be done manually or directly by a computer, without human intervention.

After the polymerization reaction the polymer is typically extruded and granulated, and the granules so obtained are mixed and transported to storage facilities. In passing through these material handling sections, contamination of the polymer may sometimes result. Serious contamination, in the form of oxidized or charred polymer, can readily be detected by visual inspection of the granule.

It is however, impossible to determine the subsequent processing behavior of the polymer by visual inspection of the granules.

In particular, the inspection for the presence or absence of gel particles in the polymer poses difficulties.

The problem is that the presence of gel particles cannot be established from the appearance of the granulate. Such gel particles result from small quantities of polymer possessing a molecular structure which deviates from that of the general mass of the material. The deviations in molecular weight or molecular weight distribution may be caused by polymer decomposition, crosslinking or oxidation. In any event, as a consequence the resulting so-called gel particles exhibit deviating flow properties particularly during extrusion operations, as for making film.

These deviating flow properties are especially important when the polymer is to be processed into film. The gel particles deform the film in their immediate surroundings and thus can be clearly observed optically as a defect. Their size may vary from 100 $\mu$m up to 1 cm. In addition, these particles may cause the formation of holes and possibly even fractures in the film.

Polymers which are known to present this problem are especially those of polyolefins such as polymers of ethylene and propylene or copolymers of these monomers with other monomers.

These polymer products are usually monitored as a quality control for the presence of gels by the off-line processing of the granulate into film. Specially trained laboratory technicians visually examine the gel level, check the processability to film and the minimum film thickness and inspect the material for the presence of holes and fractures, etc.

As a result, the visual gel content determination is characterized by subjectivity and, linked with this, limited reproduceability and accuracy.

Analytical equipment now exists with which the gel current of a film can be measured continuously. The use of this equipment significantly improves the reproduceability and the accuracy of the test method.

However, whereas it is possible generally to control the polymerization process parameters by monitoring the polymer melt index, it is not possible to control (or reduce) the gel content of polymers by changing the process conditions. Nonetheless, it is the gel content which supplies the operator with valuable information on the product quality, which he can then use in selecting the product granulate.

Since, as indicated above, the processing into film and the determination of the gel content takes place off-line, it has been impossible for relatively small lots with deviating product specifications such as poor film properties to be isolated and separated from acceptable product in a timely manner, before general product mixing and storage. As a consequence, substantially large quantities of polymer have had to be rejected on the basis of the specifications of only a relatively small sample than would have been necessary if the deviating lot in question could have been isolated in more timely fashion.

The object of this invention is therefore to provide a process offering the possibility of continuously determining the quality of incremental amount of the polymer as prepared and, when necessary, to isolate polymer lots of unacceptable quality prior to main product line mixing and storage.

The process according to the invention is characterized in that a product sample flow is continuously withdrawn from a flow of solid product polymer particles, this sample product flow is then analyzed, while the main product flow of polymer particles is, after the sample flow is drawn off, delivered into a residence-time retention means, wherein the residence time equals the time required for the analysis operation or does not differ more than 10% therefrom. The flow of polymer particles leaving the said retention means is then transported further dependent upon the analytical result.

The withdrawn sample flow is continuously supplied to an extruder, whereby a film is made from the sample and this film is then analyzed for its properties.

This analysis can be performed by means of a gel counter, a clarity meter, a gloss meter, etc., and can be performed on cast film or on blow film.

It has been found that the process according to the invention allows the off-spec polymer to be separated from the rest of the polymer in a very simple way, so that the percentage of product which has to be rejected in the final inspection on the basis of the specifications is subsequently lower.

More specifically, this invention provides a process for continuously monitoring and controlling the gel content product quality from a polymer production unit, and for automatically separating acceptable polymer product from unacceptable or off-specification polymer product, including (a) continuously formulating a particulated solid polymer product, and passing said product along a transport line;

(b) periodically or continuously withdrawing a product sample from said product transport line, which sample is supplied to an extruder and a film is prepared therefrom (c) at least intermittently analyzing said film to determine the properties thereof, while (d) meantime continuously delivering the product flow after sampling to a residence holding device which will retain said sampled product lot for a period of time equal to the time required to perform said analysis on said sample, or not differing more than 10% therefrom (d) providing a signal representative of the result of said analysis for operating a flow diverter device responsive to said signal, whereby as determined by said analysis, acceptable sampled product lot is then delivered from said residence holding device to the main product delivery line to a product storage facility, while any unacceptable or off-specification polymer product lot is instead delivered to a by-product delivery line.

The residence time device is in this context understood to be a bunker, a silo or a similar facility in which the flow of polymer particles when pass through the device has a constant residence time while also avoiding large-scale mixing of the product. As a residence time bunker, for instance, a normal storage bunker with conical bottom may be used, the discharge opening of the bunker being modified in such a way that that substantially no mixing of the product occurs. Another, although presently more expensive solution may be the use of of a long transport line segment in which a sufficiently long residence time is created.

Sampling from the product flow of polymer particles may be achieved in a known way, for instance, as described in U.S. Pat. No. 3,293,918.

The process according to the invention is preferably applied to the preparation of high-, medium-, or low-density polyethylene or of polypropylene, including copolymers of ethylene and propylene with each other or with other monomers such as butene, hexene or octene, and more specifically to the preparation of polyethylene under high pressure (500–7000 bar).

The invention also relates to an installation and apparatus for the preparation of an polymer comprising, inter alia, a reaction section and a transport line for transport of a flow of solid polymer particles from the reaction section to a storage facility.

The installation according to the invention is characterized in that the transport line is provided with a sampling device, which device is, via a transport line, connected with an analytical equipment which can transmit a signal to a distribution device in the storage facility, while a residence time bunker is installed in the transport line between the sampling point and the storage facility.

More specifically this invention provides apparatus for the continuous monitoring and control of the gel content product quality of a polymer product including a production unit, a transport line and a product storage facility, and in combination therewith means providing a flow of solid polymer product particles to said transport line, a transport line for transporting said flow of solid polymer product particles from said production unit to said storage facility, separate by-product storage means, residence means associated with said transport line for providing a residence hold-up time for a product sample lot, product flow diversion means located downstream of said residence means and adapted to direct product flow alternatively either to said product storage means or to said by-product storage means, means for withdrawing a product sample from said transport line and a point upstream of said residence means, means for analyzing said withdrawn sample for film-properties and providing a signal representative of the level of the analyzed gel content product quality, means responsive to said signal for operating said flow diversion means to direct the product flow to the acceptable product storage means or to the by-product storage means according to the results of said analysis, with said residence means providing a residence hold-up time required for performing said analysis, or not differing more than 10% therefrom.

Figure 2:
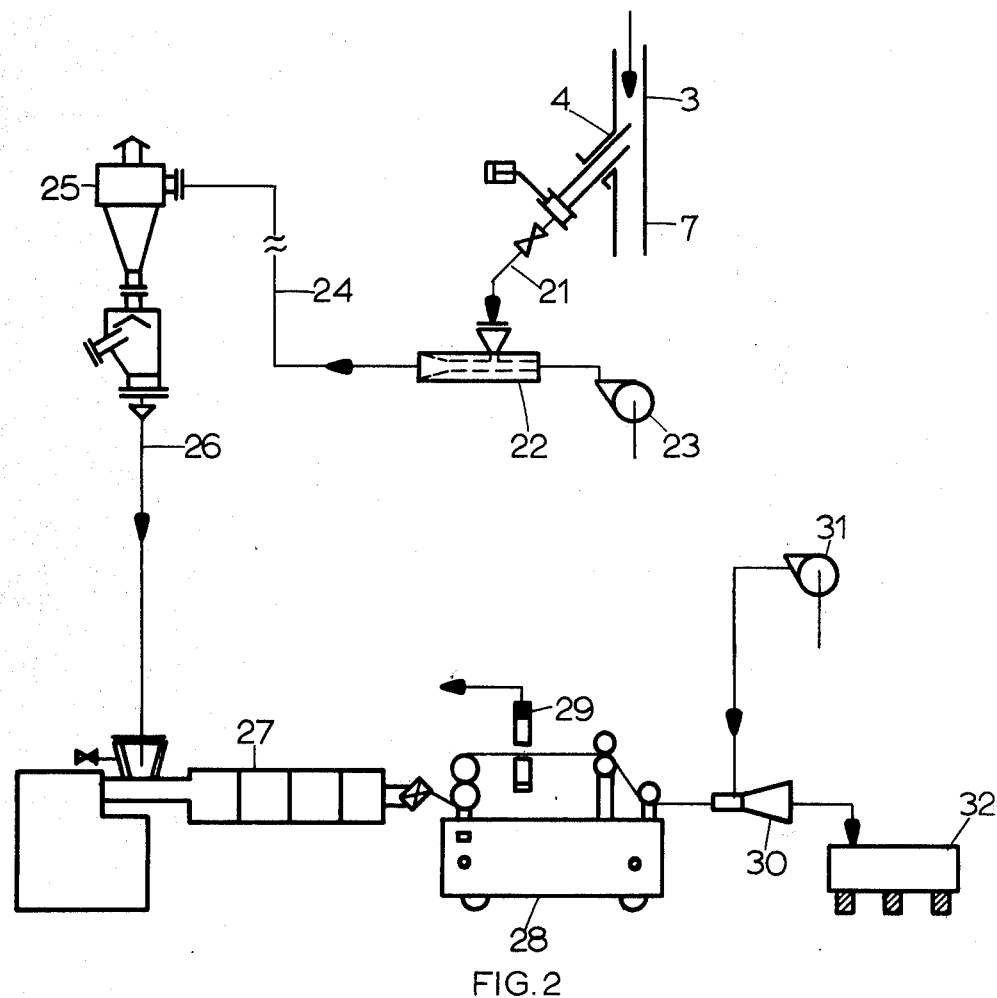

The invention will now be elucidated on the basis of a drawing in which:

FIG. 1 represents the process according to the invention in the form of a block diagram, and FIG. 2 schematically represents the sampling and subsequent analysis of the sample.

In FIG. 1, feedstocks are fed to polymerization unit 2 via line 1. These feedstocks include monomers, initiators or catalyst, and auxilliary materials such as antioxidants. Via line 3, polymer particles flow to sampling point 4. Via line 5, the sample is passed to analytical equipment 6, here indicated in the form of a block. The main flow of polymer particles enters residence time bunker 8 via line 7. The bottom of this bunker 8 is provided with distribution valve 10, which is controlled via signal transmission line 9. Responsive to the nature of the signal, the product is either sent from the bunker 8 to storage bunker 12 via line 11, if it meets the specifications, or to storage bunker 14 via line 13 if it does not meet the specifications.

The residence time in bunker 8 is sufficiently long that the signal, which at a certain point in time reaches valve 10 via transmission line 9 originated from a sample which is taken from the product passing said valve at the same point in time. Optionally, a small safety margin can be built in to allow for a slight spread in residence time in the analytical equipment 6 and/or bunker 8. This safety margin can be, for instance, up to 10% of the total residence time.

In FIG. 2, an embodiment of the sampling device and the analytical equipment is shown in more detail. Via line 3, a flow of polymer particles reaches sampling point 4. Via line 21, injector 22, booster 23 and line 24, a small portion of the flow of polymer particles enters cyclone 25. After separation from the transport air, the flow of polymer particles passes through line 26 to extruder 27, wherein the polymer particles are molten and extruded to form a film. The film is subsequently transported to apparatus 28, where the film is analyzed with meter 29. The signal from meter 29 is sent to valve 10 via line 9, and optionally via a signal conversion equipment.

The film is subsequently discharged to waste bin 32 via injector 30 and booster 31.

EXAMPLE AND COMPARATIVE EXAMPLE

The process as described in the drawing, using a gel counter as analytical equipment, has been tested in a plant for the preparation of low-density polyethylene during a 6-month period. The percentage of total product that was rejected on the basis of the process according to the invention, amounted to about 1.25 wt. %.

In a comparable period, during which the process according to the invention was not employed, and during which comparable products were prepared, the percentage of product rejected on the basis of gel content was about 3 wt. %.

What is claimed is:

1. A process for continuously monitoring and controlling the product film quality from a polymer production unit, and for automatically separating acceptable polymer product from unacceptable or off-specification polymer product, said process comprising the steps of:

(a) continuously formulating in said polymer production unit a particulated solid polymer product, and passing said product from said polymer production unit along a transport line to a product sampling point;

(b) periodically or continuously withdrawing a product sample at said product sampling point from said product transport line, supplying said product sample to an extruder and preparing a film therefrom;

(c) at least intermittently analyzing said film to determine the film properties thereof, while (d) meantime continuously delivering the product lot remaining after sampling is practiced according to step (b) to a residence holding device which will retain said sampled product lot for a period of time equal to, or differing not more than 10% from the time required to perform the analysis according to step (c) on said sample; and (e) providing a signal representative of the result of said analysis for operating a flow diverter device responsive to said signal, whereby as determined by said analysis, acceptable sampled product lot is then delivered from said residence holding device to the main product delivery line to a product storage facility, while any unacceptable or off-specification polymer product lot is instead delivered to a by-product delivery line.

2. Process according to claim 1, wherein said film is analyzed with a gel counter, a clarity meter and/or a gloss meter.

3. Process according to claim 1 or 2, wherein said polymer is polyethylene of high-, medium- or low-density, polypropylene or PVC.

4. Process according to claim 1, wherein said polymer is polyethylene prepared under high pressure.

* * * * *